(12) United States Patent
Duelli et al.

(10) Patent No.: US 6,388,359 B1
(45) Date of Patent: May 14, 2002

(54) METHOD OF ACTUATING MEMS SWITCHES

(75) Inventors: Markus Duelli; Donald M. Friedrich; Bryant P. Hichwa, all of Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/517,913

(22) Filed: Mar. 3, 2000

(51) Int. Cl.[7] .......................... H01H 59/00; H01L 23/52
(52) U.S. Cl. ........................................................ 310/309
(58) Field of Search ........................................... 310/309

(56) References Cited

U.S. PATENT DOCUMENTS

| | | | |
|---|---|---|---|
| 5,025,346 A | 6/1981 | Tang et al. | 361/283 |
| 5,519,240 A * | 5/1996 | Suzuki | 257/315 |
| 5,594,820 A | 1/1997 | Garel-Jones et al. | 385/22 |
| 5,629,565 A * | 5/1997 | Schlaak et al. | 257/780 |
| 5,909,078 A | 6/1999 | Wood et al. | 310/307 |
| 5,923,798 A | 7/1999 | Aksyuk et al. | 385/19 |
| 5,943,454 A | 8/1999 | Aksyuk et al. | 385/22 |
| 5,955,817 A | 9/1999 | Duhler et al. | 310/307 |
| 5,994,816 A | 11/1999 | Dhuler et al. | 310/307 |
| 5,995,688 A | 11/1999 | Aksyuk et al. | 385/14 |
| 5,998,906 A | 12/1999 | Jerman et al. | 310/309 |
| 6,046,659 A * | 4/2000 | Loo et al. | 333/262 |
| 6,058,027 A * | 5/2000 | Vargha et al. | 363/33 |
| 6,160,230 A * | 12/2000 | McMillan et al. | 200/181 |
| 6,229,683 B1 * | 5/2001 | Goodwin-Johansson | 361/233 |
| 6,303,885 B1 | 10/2001 | Hichwa et al. | 200/181 |

FOREIGN PATENT DOCUMENTS

| | | | |
|---|---|---|---|
| DE | 3644802 | 7/1988 | |
| EP | 0 880 040 | 5/1997 | |
| EP | 1 004 910 | 11/1999 | |
| JP | 6-148536 A * | 5/1994 | 310/309 |
| WO | WO 98/12589 | 3/1998 | G02B/26/02 |

OTHER PUBLICATIONS

Marxer and de Rooij, Micro–Opto–Mechanical 2×2 Switch for Single–Mode Fibers Based on Plasma–Etched Silicon Mirror and Electrostatic Actuation, IEEE J. of Lightwave Technology, vol. 17, No. 1, 2–8 (Jan. 1999).

Lee et al., Bi–Stable Planar Polysilicon Microactuators with Shallow Arch–Shaped Leaf Springs, SPIE Conference on Micromachined Devices and Components V, 274–279 (Sep. 1999), Santa Clara, California.

Chen et al., A High–Speed Low–Voltage Stress–Induced Micromachined 2×2 Optical Switch, IEEE Photonics Technology Letters, vol. 11, No. 11, 1396–1398 (Nov. 1999).

* cited by examiner

*Primary Examiner*—Thomas M. Dougherty

(57) ABSTRACT

A switching signal having multiple sequential pulses is applied to a MEMS switch. A first pulse moves the switch from a first switch position toward a second switch position. After a selected dwell period, a second pulse is applied to dampen ringing or overshoot of the movable portions of the switch. In a further embodiment, non-symmetrical switching signals are used to cycle the switch from the first state to the second state, and back to the first.

16 Claims, 7 Drawing Sheets

METHOD OF ACTUATING MEMS SWITCHES

CROSS-REFERENCE TO RELATED APPLICATIONS

This patent application is being concurrently filed with U.S. patent application Ser. No. 09/517,650 entitled TAPERED LENSED FIBER OPTICAL SWITCH by Hichwa et al; U.S. Pat. App. Ser. No. 09/517,649, now U.S. Pat. No. 6,303,885 entitled BI-STABLE MICRO SWITCH by Hichwa et al; and U.S. patent application Ser. No. 09/518,743, now U.S. Pat. No. 6,210,540 entitled METHOD AND APPARATUS FOR DEPOSITION OF THIN FILMS ON VERTICAL SURFACES by Hichwa, the disclosures of which are hereby incorporated by reference for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention is generally related to switches for use in micro systems, and more particularly to electronic signals used to change the state of MEMS switches.

BACKGROUND OF THE INVENTION

Optical switches can be used in a variety of applications, such as optical fiber transmission networks, to route optical signals along various signal paths. An optical switch typically has an optical element, such as a mirror or a filter, that is switched into and out of a path of an optical signal beam. Switches are typically characterized by the number of input and output ports, referred to as N×N. For example, a 1×2 switch would switch one input between two outputs.

Switches can often be described as "latching" or "non-latching". A latching switch reliably remains in a known position, even if the power is removed or lost. A non-latching switch may revert to an unknown position, or even a position intermediate between switch states, when the power is lost, for example if current provided to an electromagnetic solenoid or thermal actuator is lost. One type of latching switch reverts to a known default position (state), no matter what state the switch was in when power was lost. Another type of latching switch preserves the switch state, no matter what that state was. The latter case is known as a "bi-stable" switch.

Bi-stable optical switches are desirable for use in optical telecommunication systems because they preserve the network configuration associated with the position of the switch (es) when the power was lost. Various approaches have been used to produce bi-stable optical switches. One approach uses a permanent magnet in conjunction with a piece of magnetic material to hold the switch element in the desired position. Other approaches use a mechanical latch to hold the switch element in the desired position.

In a particular application, as illustrated and described in U.S. Pat. No. 5,994,816 entitled THERMAL ARCHED BEAM MICROELECTROMECHANICAL DEVICES AND ASSOCIATED FABRICATION METHODS by Dhuler et al., issued Nov. 30, 1999, a mechanical latch is used in a micro-electro-mechanical system ("MEMS") (See, e.g. FIG. 11, ref. nums. 69 and 68c). A thermal arched beam actuator is used to move a switch element back and, with a thermally activated latch holding the switch element in the desired position(s). However, having contact surfaces between the latch and the switch element can result in the mechanism sticking or produces "stiction" (i.e. sticking friction), thus altering the force required to change switch states. This sticking or stiction can not only affect the reliability of switch operation, but could also affect the timing of the switch, particularly with fast (i.e. $\leq 1$ ms) switching in light of the need to time the operation of the latch with the operation of the actuator.

U.S. Pat. No. 5,994,816 also describes a latching mechanism that uses an electrostatic field to clamp a movable portion of the switch to the switch body (substrate). Clamping allows the relatively high current flow to the thermal beam actuator to be removed without losing the clamped switched state, thus conserving power. However, if the voltage to the electrostatic clamping circuit is removed the switch may revert to a state other than what was previously held.

In either latching or non-latching cases, an electronic signal is typically applied to the actuator to change switch states. The electronic signal is generally chosen to have sufficient energy to reliably change switch states within a given period of time. An electronic pulse, typically applied as a square wave pulse, is often used to apply a switching signal with sufficient voltage and duration to switch in a worst-case situation. Variations in required switching energy arise due to fabrication differences between switches, environmental considerations, aging, and other factors to contribute to a worst-case situation. Unfortunately, applying such a switching signal may provide more energy than is needed and may drive the switch to induce ringing or overshoot.

Accordingly, it is desirable to provide an electronic switching signal that reliable switches a MEMS switch with reduced overshoot and ringing.

SUMMARY OF THE INVENTION

The present invention provides a method of actuating a MEMS switch with an electronic signal that accelerates a movable portion of the MEMS switch from a first switch position toward a second switch position, and then decelerates the movable portion of the MEMS switch before it reaches the second switch position.

In one embodiment, the switching signal includes a first electronic pulse, a selected dwell period, and a second electronic pulse. The MEMS switch includes an electrostatic comb drive motor as an actuator, for example, having two electrostatic arrays, one array configured to move a movable portion of the switch in a first direction, and the other array configured to move the movable portion of the switch in a second direction in response to applied electrical signals. In one embodiment, a "push" pulse is followed after a selected dwell period with a "pull" pulse. In another embodiment, a first push pulse is followed after a longer dwell period by a second push pulse. The pulses may approximate square wave pulses, or may include ramped leading and/or following edges, as well as alternatively or in addition to a sloped pulse top. The combination of serial pulses with the selected dwell period dampens or decelerates the motion of a center body (movable portion) or the switch, which in a particular embodiment is attached to the static portions of the switch with spring arms.

In yet a further embodiment, the MEMS switch requires a first amount of energy to switch from a first state to a second state, and a second (different) amount of energy to switch from the second state back to the first. A MEMS switching cycle includes a first switching signal having a first pulse, a first selected dwell period, and a second pulse; and a second switching signal having a third pulse, a second selected dwell period, and a fourth pulse, wherein the energy available from the first switching signal is less than the energy available from the second switching signal.

DETAILED DESCRIPTION OF THE INVENTION

I. Introduction

The present invention describes waveforms for driving MEMS switches from one state to another. In one embodiment, a switching signal is applied to an actuator integrated in a MEMS switch. The actuator could be integrated in a hybrid or composite fashion, i.e. coupled to the MEMS die as a separate component, or integrated in a monolithic fashion, i.e. fabricated in the MEMS die along with other features of the MEMS structure. The switching signal includes a first pulse operating on a switching element to move the switching element from a first switch position toward a second switch position. After a period of time ("dwell"), a second pulse is applied to the actuator. The second pulse operates on the switching element to decelerate the switching and stabilize switch operation. The second pulse is desirable to reduce overshoot or ringing, for example.

II. Bi-Stable MEMS Switch

Figure 1A:
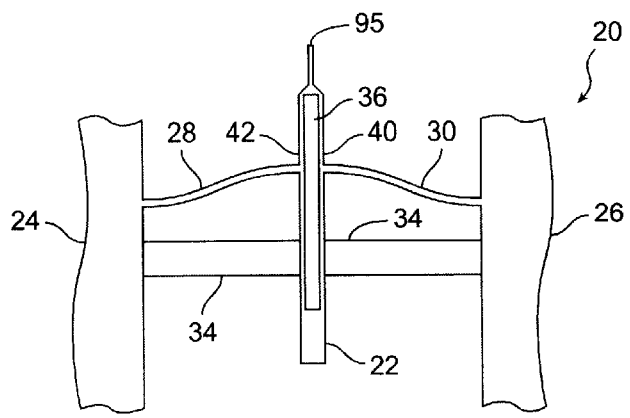
FIG. 1A is a simplified diagram of a portion of a bi-stable latching MEMS witch device according to the present invention in a first position.

FIG. 1A is a simplified top view of a portion of a bi-stable MEMS switch 20 according to an embodiment of the present invention in a first latched switch state. The switch includes a movable center body 22 attached to fixed (static) portions of the switch 24, 26 by spring arms 28, 30. An actuator 34, such as a thermal beam actuator, electrostatic comb drive, or electromagnetic actuator, is coupled to the center body, and provides a motive force to the center body to move it between a first latched switch state and a second latched switch state. The center body includes a hollow beam portion 36 that has a hollow center portion 38 and hollow beam walls 40, 42. The hollow beam walls act in conjunction with the spring arms 28, 30 to allow deflection of switch elements and storing of spring energy. The spring arms 28, 30 are essentially opposite each other at the walls of the hollow beam portion. In a preferred embodiment, two pairs of spring arms, each in conjunction with a hollow beam portion, are used to stabilize and guide the center body between switch positions. In alternative embodiments, other mechanical elements might be used to guide and stabilize the center body. A further understanding of the operation of the switch elements is provided in reference to FIGS. 2A–2D, below.

The MEMS switch may be made in accordance with various known fabrication processes. In a particular process, the switch is made on a commercially available silicon-on-insulator ("SOI") wafer. The SOI wafer includes a single-crystal base and approximately 2 microns of thermally grown silicon oxide between the base and approximately 73 microns of single-crystal silicon overlying the silicon oxide. The SOI wafer was made according to a wafer bonding process, but it is understood that the wafer is described for purposes of illustration and discussion only, and might be made according to other processes or with other types or thicknesses of layers.

Features of the MEMS switch are formed in the thin layer of silicon overlying the oxide layer using a highly directional etch technique, such as a biased plasma etch technique, as are well known in the art. A hydrofluoric acid ("HF") etch process is used to remove the oxide underneath portions of the switch movable in relation to the base, such as the spring arms and center body. The HF etch is generally isotropic, and removes a portion of the oxide underlying static portions of the switch, but this does not significantly affect the characteristics, performance, or the reliability of the switch. Access by HF to the portions of oxide to be removed is facilitated by keeping the sections of movable portions of the switch relatively thin. In general, the undercutting of static portions of the switch, which generally have a single-sided exposure to the HF, will be half the distance between edges of the thickest movable portions having double-sided exposure to the HF.

Figure 1B:
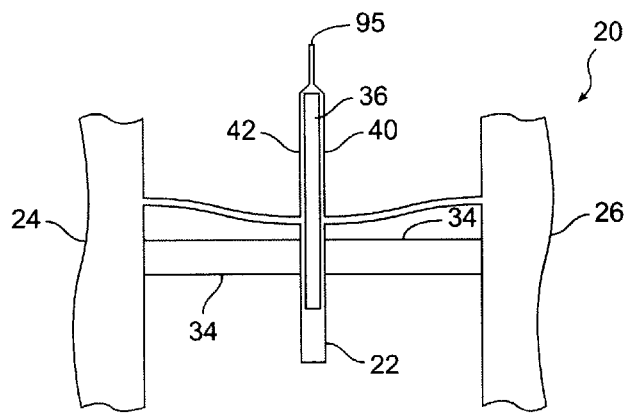
FIG. 1B is a simplified diagram of the portion of the device shown in FIG. 1A in a second position.

FIG. 1B is a simplified top view of the portion of the bi-stable MEMS switch 20 shown in FIG. 1A in a second latched switch state. The actuator 34 has applied a motive force to the center body 22 to retract the center body from the first switch position. The terms "extend" and "retract" are used for purposes of convenient discussion only. The spring arms have assumed a different shape from their shape represented in FIG. 1A. This difference in shape will be referred to as "deformation", which may induce a variety of shapes in the spring arms, such as an "S" shape or a "C" shape. The combination of the spring arms in conjunction with the walls of the hollow beam portion provide a linear spring-type of energy storage, as opposed to the non-linear bucking that can arise with conventional non-compressible arms.

If arms similar to the spring arms of the present invention are used with a solid center beam, the strain in the arms can build up in the arm material to a critical degree and cause buckling of the arms, i.e. twisting or bending out of the plane of the substrate. This buckling is typically non-linear, and can result in unpredictable switch behavior. In the present invention, the deformation of the hollow beam portion of the center body provides a restoring (spring) force proportional to the displacement of the wall. The displacement of the wall at least partially accommodates the strain in the arms, thus avoiding buckling.

Figure 1C:
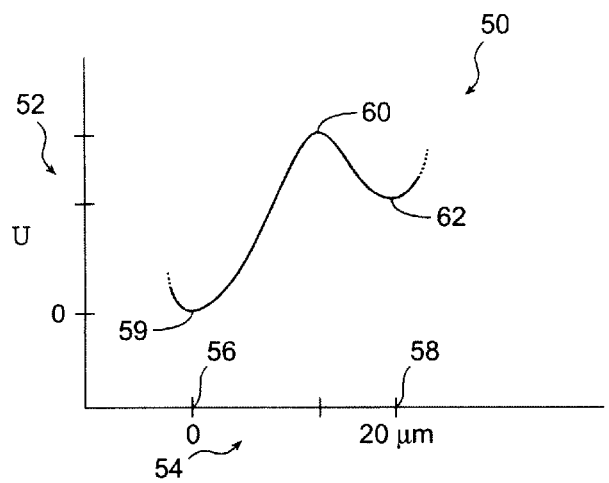
FIG. 1C is a simplified graph of the mechanical potential energy state of a bi-stable switch-during operation according to an embodiment of the present invention.

FIG. 1C is a simplified graph 50 of potential energy 52 versus displacement of the center body in reference to the static switch body for a switch according to an embodiment of the present invention. The as-fabricated position 56 of the center body will be given the reference of zero displacement 54 and zero potential energy for purposes of illustration, and will be referred to as the first switch position. Moving the center body in either a positive or negative direction increases the potential of the switch. For purposes of illustration, movement toward the second switch position will be termed a positive displacement.

As the center body is moved toward the second switch position 58, the potential increases to a potential maximum 60, and then decreases to a local minimum 62 at the second switch position. Although the local minimum 62 has a higher potential than the first switch position (another potential local minimum), it is stable because energy is required to move the switch away from the local minima. The potential maximum represents a compressed state of the spring arms and/or the hollow beam walls. Some of this energy is released as the center body moves to the second switch position.

Generally, switching from the first switch position to the second switch position requires sufficient energy to move the center body from the reference (zero potential) position to the potential maximum. However, switching from the second switch position to the first switch position may be different, requiring the energy necessary to move the center body from the second switch position over the potential maximum, which is generally less, but could be essentially the same or even more.

III Analytical Model

Figure 2A:
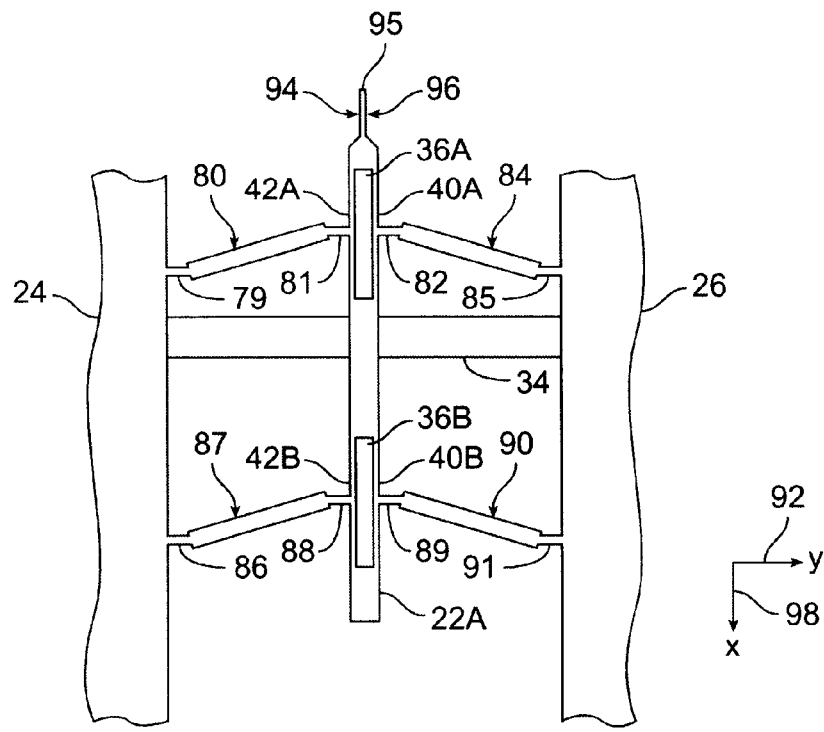
FIG. 2A is a simplified representation of a portion of a switching device according to the present invention illustrating various aspects used in modeling the operation of the device.

FIG. 2A is a simplified representation of a portion of a switching device according to the present invention illustrating various aspects used in modeling the operation of the device. For purposes of illustration, the actuator described is an electrostatic comb drive. The force generated by a voltage V in an electrostatic comb drive actuator can be expressed by the formula:

$$F_{es} = n\epsilon h/g V^2 \quad \text{(Eq. 1)}$$

n is the number of comb fingers. A typical figure in the existing designs is around 100. The height of the structure h is about 70–75 $\mu$m. The gap g between the comb fingers can be reduced down to 4 $\mu$m. The dielectric constant of the medium (vacuum, gas or fluid) between the comb drive fingers is $\epsilon$.

Using these values one can calculate the typical force generated by a comb drive actuator for a given voltage in different media:

|  | Air | Oil |
|---|---|---|
| Force at 70 V | 80 $\mu$N | 160 $\mu$N |

Thus, application of 70 V to the comb actuator should switch the suspension structure between its two bi-stable states if the force required to pass the unstable barrier is <160 $\mu$N for oil filled devices and <80 $\mu$N for air filled devices.

Figure 2B:
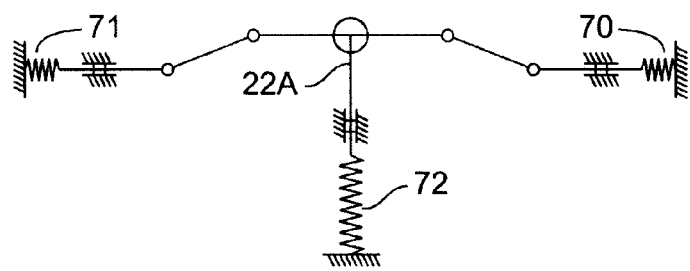
FIGS. 2B–2D are simplified representations of a spring model of a bi-stable switch according to an embodiment of the present invention.
Figure 2C:
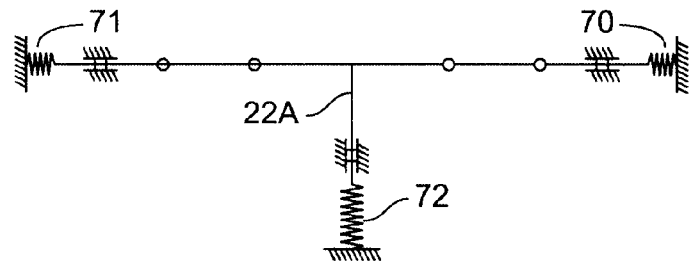
Figure 2D:
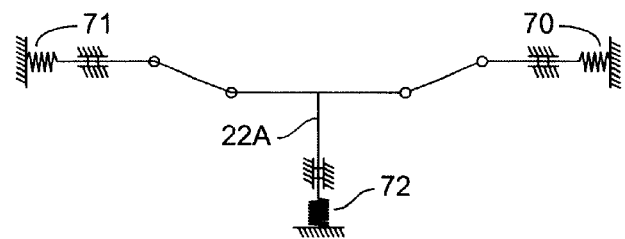

The bi-stable behavior of the structure in FIGS. 1A and 1B arises from a lateral force which holds the structure in its deformed equilibrium state. The spring model shown in FIGS. 2B–2D more clearly illustrates the forces acting in the structure of FIG. 2A as it is switched between states. FIGS. 2B–2D are not representative of the actual physical deformation in the MEMS device, but rather are illustrative of the analytical model. In the rest position, i.e. such as the structure as it is fabricated, all springs are in a released state (FIG. 2B). When the structure is moved in the longitudinal direction both the lateral springs 70, 71 as well as the longitudinal spring 72 are compressed. After half the deformation (FIG. 2C), the lateral springs 70, 71 start decompressing again, which results in a force acting into the longitudinal direction. If this force is higher than the restoring spring force from the longitudinal springs, the structure will have two static equilibrium states. The compression of the hollow beam walls (see e.g. FIG. 2a, ref. num. 42A) are represented by the lateral springs 70, 71 and the restoring force of the spring arms is represented by the longitudinal spring 72.

The structure modeled in FIGS. 2B–2D can be realized by fabrication of the structure shown in FIG. 2A. The longitudinal spring 72 of FIG. 2B is formed by the 4 spring arms 80, 84, 87, 90 which have a total linear spring constant of:

$$k_h = 2 \frac{E h t_h^3}{4 l_h^3 - 6 l_h^2 L_h + 3 l_h L_h^2} \quad \text{(Eq. 2)}$$

Where E is the Young's modulus of silicon, typically about 170 GPa, h is the height of the structure (nominally 75 $\mu$m), $t_h$ is the thickness of the flexible hinges 79, 81, 82, 85, 86, 88, 89, 91, $I_h$ is the length of the hinges (assumed to be the same for all hinges in this model), and $L_h$ is the total length of one suspension arm (also assumed to be the same for all arms in this model). The factor 2 takes into account the total number of 4 spring arms.

The 4 lateral springs have a total spring constant of:

$$k_l = 4 \frac{16 E t_l^3 h}{l_l^3} \quad \text{(Eq. 3)}$$

where $t_l$ and $l_l$ are the thickness and respectively the length of this double clamped suspension. The suspension is double clamped because both the first opposite pair of arms 80, 84 and the second pair of arms 87, 90 (in conjunction with the respective hollow beam walls 42A, 40A and 42B, 42B) clamp the center body 22A in one of the two switch states. The distance between the two equilibrium points can be adjusted by the initial offset.

To find an analytical expression describing structure of FIG. 2A, we will first consider the flexible hinges infinitely compliant, i.e. $k_h = 0$. Applying a force $F_y$ in the y direction 92 at a clamping point creates a reaction force $F_x$ in x direction 98 on the mobile structure (i.e. center body). These forces are related to one another through the expression below:

$$F_x = \frac{x-d}{L_h} F_y \quad \text{(Eq. 4)}$$

where x is the longitudinal displacement of the mobile structure. In a particular embodiment an optical element, such as a mirror, is mounted or formed on a mounting portion 95 of the center body. When the mobile structure is displaced in the x direction 98, the lateral springs will be deformed by the amount $\Delta y$:

$$\Delta y = \sqrt{d^2 + L_h^2} - \sqrt{(d-x)^2 + L_h^2} \quad \text{(Eq. 5)}$$

The force $F_{xy}$ in x direction resulting from this $\Delta y$ can be obtained by multiplying this deformation by the spring constant $k_l$ and replacing $F_y$ in equation (Eq. 4):

$$F_{xy} = \frac{d-x}{L_h} k_l \left[ \sqrt{d^2 + L_h^2} - \sqrt{(d-x)^2 + L_h^2} \right] \quad \text{(Eq. 6)}$$

The expression in the brackets [ . . . ] is always greater than or equal to zero. The sign of the force $F_{xy}$ is thus only determined by the expression (x–d)/L, which changes its sign when x becomes larger than d, i.e. when the structure passes its center point ( as in FIG. 2C). In order to obtain the desired bi-stable behavior this force $F_{xy}$ should be higher than the restoring spring force once the structure has passed into the position shown in FIG. 2D, as described above in conjunction with FIG. 1C.

The restoring spring force from the flexible hinges can be expressed by:

$$F_{xx} = x k_h \quad \text{(Eq. 7)}$$

Finally the static equilibrium can be written as:

$$F_{es} - F_{xx} - F_{xy} = 0 \quad \text{(Eq. 8)}$$

which states, that the external force, i.e. the electrostatic drive $F_e$, has to counterbalance the restoring spring force $F_{xx}$ from the flexible hinges and as well as the force $F_{xy}$ from the lateral springs. Those skilled in the art will appreciate that the model provided above is simplified and exemplary only, and that other switch structures might be more accurately represented by other models.

IV. Further Details of an Exemplary Device

Figure 3A:
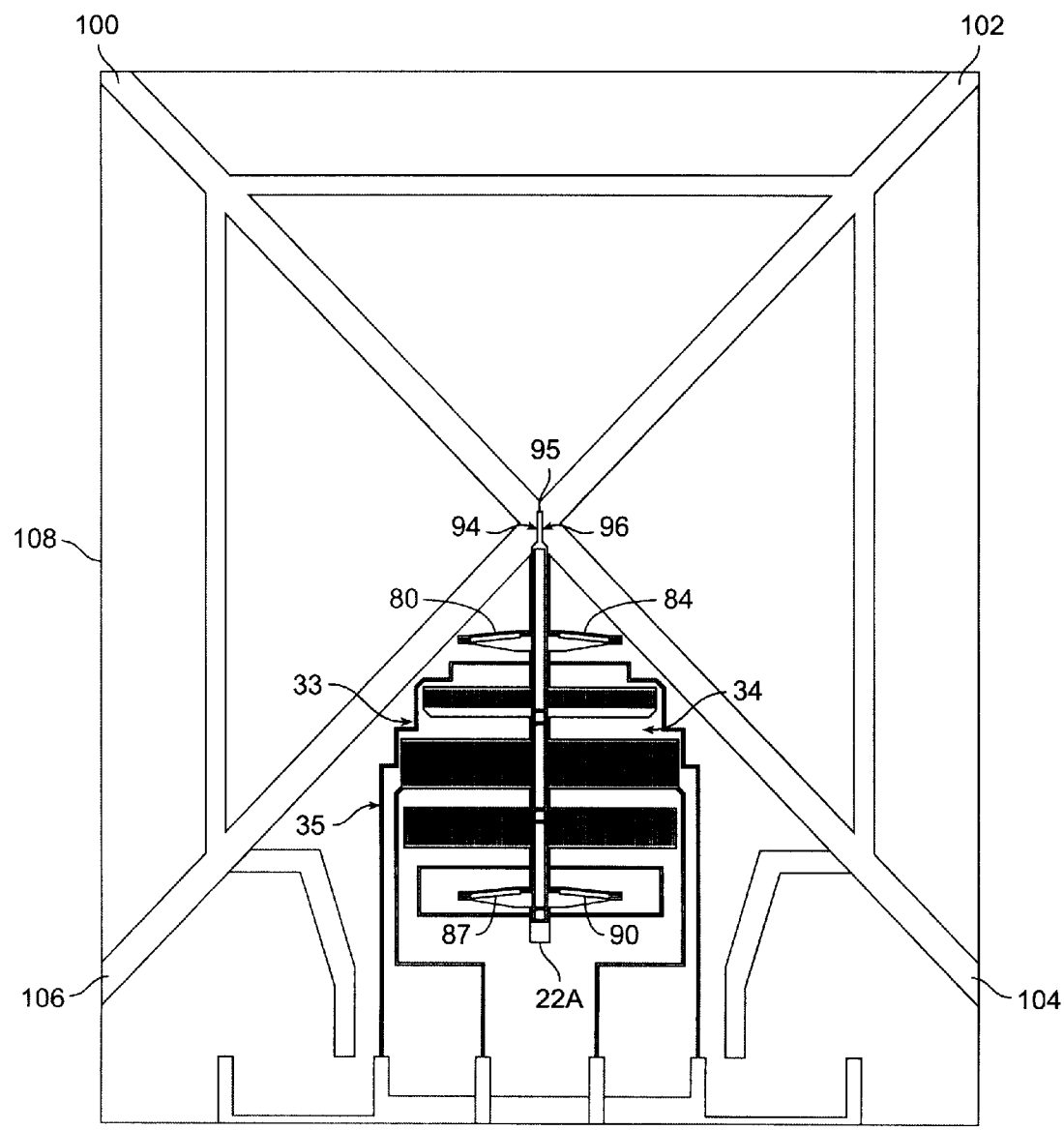
FIG. 3A is a simplified top view of a portion of a switch device and electrostatic comb drive actuator according to an embodiment of the present invention.

FIG. 3A is a simplified top view of a portion of a MEMS switch device and electrostatic comb drive according to an embodiment of the present invention. The spring arms 80, 84, 87, 90; hinges (not shown in this figure); center body 22A including a mounting portion 95; and actuator 34 are fabricated in a nominally 75 micron-thick layer of single-crystal silicon overlying a thin (e.g. 2–5 micron) silicon oxide layer on a silicon wafer substrate. The actuator includes a first section 35 and a second section 33. Each section includes an array of opposing "fingers". When a voltage is applied to the opposite halves (not shown) of the first section, the center body is retracted from its as-fabricated position. When a voltage is applied to the opposite halves of the second section, the center body is extended toward its as-fabricated position.

The mounting portion 95 is about 1 micron thick, but can be thicker if desired. In an exemplary embodiment a thin film of reflective material is deposited on a vertical (to the substrate) surface of the mounting portion to serve as a mirror that is switched in and out of an optical signal path. In a further embodiment, a reflective coating is formed on both surfaces 94, 96 of the mounting portion and the mirrors are switched into and out of two optical paths to form a 2×2 optical switch. The mirrors could be, for example, sputtered thin film layers of gold about 1000 Angstroms thick, or other metals or reflective coatings. It is generally desirable that the mirror surface be smooth, highly reflective (>97%) in the wavelengths of interest, and not transmit light from one side of the mounting portion to the other. The etched surface of the mounting portion can be smooth enough to serve as a suitable mirror substrate.

Additional features include channels, or grooves, 100, 102, 104, 106, for mounting four optical fibers (not shown) to the MEMS chip 108. The grooves were formed in the structure concurrently with the electrostatic comb drive actuator and other features of the device using a deep reactive ion etch (DRIE") process. The MEMS chip is sawn or otherwise separated from the substrate and is about 4 mm by 3.4 mm.

Figure 3B:
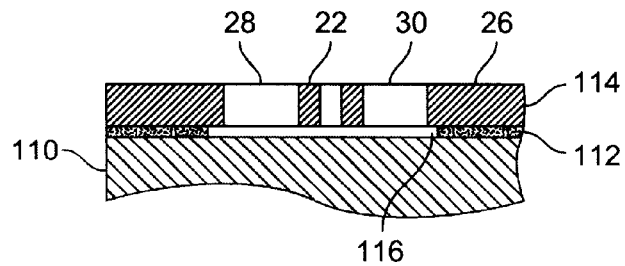
FIG. 3B is a simplified cross section of a portion of a MEMS device illustrating separation between the substrate and movable portions of the device.

FIG. 3B is a simplified cross section of a portion of a MEMS switch according to an embodiment of the present invention showing the silicon substrate 110, the oxide layer 112, and the overlying silicon layer 114. The oxide layer has been removed from beneath the center body 22 (the hollow portion) and the spring arms 28, 30 with an HF etch, which has formed small undercuts 116 underneath the static portions of the overlying silicon layer. Devices made in accordance with the present invention have been cycled between two bi-stable states for between 200 million and 1 billion complete cycles depending on the particular testing protocol. No device failures have been observed in these tests. Other material systems may be used with suitable modifications to the fabrication techniques, if necessary.

V. A Bi-Stable MEMS Optical 2×2 Switch

Figure 4A:
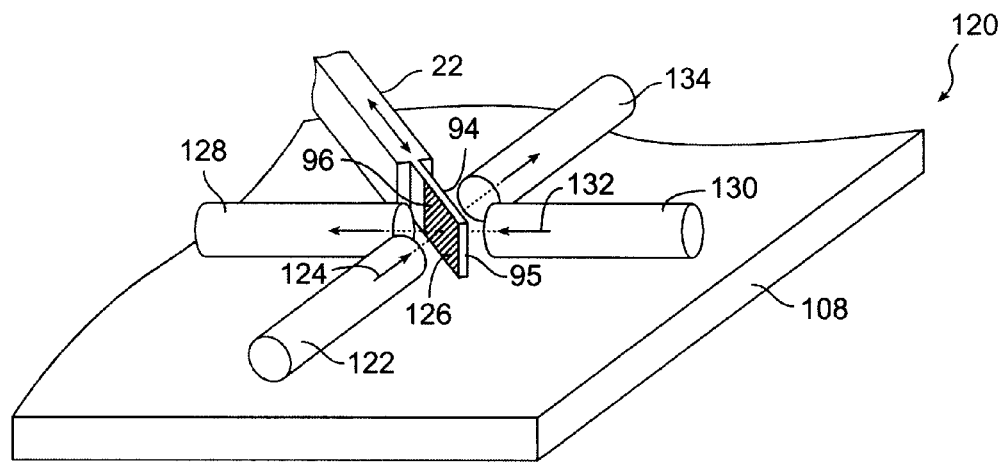
FIG. 4A is a simplified perspective view of a portion of a MEMS chip according to the present invention illustrating 2×2 optical switch in the bar state.

FIG. 4A is a simplified perspective view of a portion of a MEMS chip according to the present invention used in an optical switch 120 in a "bar" state. Mirrors have been formed on the surfaces 94, 96 of the mounting portion 95 of the center body. A first input fiber 122 provides an optical signal, represented by the arrow 124 to a mirror coating 126 on the first surface 96 of the mounting portion when the center body is extended, and reflects the optical signal to a first output fiber 128. A second input fiber 130 provides a second optical signal, represented by the arrow 132, to a mirror coating (hidden in this view) on the second surface 94 of the mounting portion, which reflects the second optical signal to a second output fiber 134.

Figure 4B:
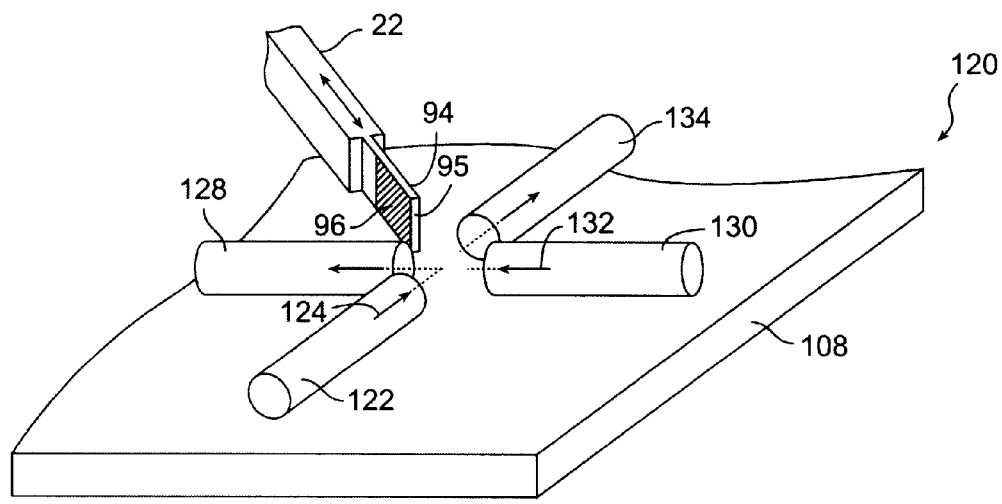
FIG. 4B is a simplified perspective view of the portion of the MEMS chip in FIG. 4A in the cross state.

FIG. 4B shows the optical switch of FIG. 4A in a "cross" state with the center body retracted so that the mirrors are not in the optical paths of the first or second optical signals from the first and second input fibers. In this switch state, the first optical signal couples to the second output fiber 134 and the second optical signal couples to the first output fiber 128. The angle between the first input fiber and first output fiber (and similarly second input fiber and second output fiber) is 90°, but in an alternative embodiment the angle is 70° to reduce polarization-dependant losses. Other angles may be used.

Although the embodiment described in conjunction with FIGS. 4A and 4B relate to optical fiber inputs and outputs, it is understood that other optical transmission lines may be used, such as thin-film waveguides, and that the optical fibers may be mechanically coupled to the MEMS chip in a variety of fashions to result in an optical switch. In a particular embodiment, lensed waveguides are employed to improve the insertion loss of the switch. For example, mounting cleaved fibers at a separation suitable for inserting the mounting portion of the MEMS switch in a fiber-to-fiber insertion loss of about 1.3–1.5 dB. Further providing a lens (i.e. a light-gathering structure) on each fiber end reduces the insertion loss. If an anti-reflective ("AR") coating is also provided to the lensed end the fiber-to-fiber insertion loss can be reduced to about 0.1–0.3 dB. Lensed fibers are available from suppliers such as Optospeed SA of Mezzovico, Switzerland and Highwave Optical Technologies, of Lannion, France. Alternatively, a discrete lens could be attached to the fiber end. The lensed fibers available from Optospeed SA are tapered to provide a light focusing/gathering function, not for merely mechanical purposes, although the tapered aspect of the fiber end allows the fiber end to be brought into closer proximity with the mirror or cross fiber, thus improving insertion loss.

Although as little as 0.1 dB of insertion loss between fibers is achievable in the cross mode, this generally requires optimal alignment of the cross fibers. With this alignment, about 0.4 dB of insertion loss occurs between fibers in the bar mode of operation. This results in about 0.3 dB difference in insertion loss depending on which state the switch is in (i.e. the optical signal is reflected or directly transmitted to the selected output). To reduce this difference, the fibers can be intentionally mis-aligned or "de-focused" in the cross mode to result in increased insertion loss. The terms "focus" and "de-focus" are used for convenience and illustration, in light of the dimensions of the structures and wavelengths of the light signals involved. In some applications, aligning the fibers off-axis may improve insertion loss in the bar mode because the thickness of the mounting portion creates a difference in signal path length. In a particular embodiment, the cross path fibers with aligned to produce an insertion loss in the cross mode of about 0.3 dB, thus the difference in insertion loss between the cross path and the bar path was less than about 25%, which is desirable to avoid signal level difference between the selected switch states. Otherwise, a gain stage might (e.g. a light amplifier such as a doped fiber) in series with the signal might have to be adjusted for gain depending on the switch state.

Figure 4C:
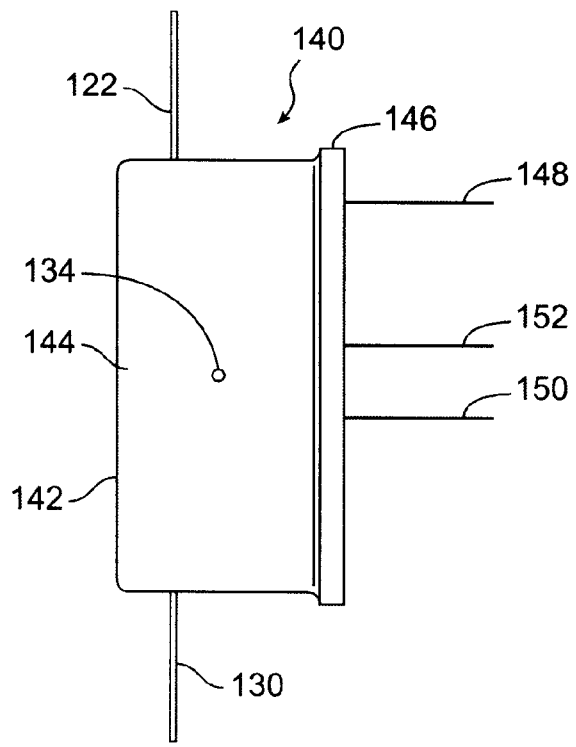
FIG. 4C is a simplified side view of a packaged bi-stable optical MEMS switch according to an embodiment of the present invention.

FIG. 4C is a simplified side view of a packaged bi-stable optical MEMS switch 140 according to an embodiment of the present invention. The actual switching device is packaged in a TO-5 package 142 that provides a hermetic seal and protects the device from external forces as well as a handling and mounting convenience. In a preferred embodiment, a low-profile TO-5 package having a can 144 height of about 4–5 mm is used. The TO-5 package has a small footprint, with a can diameter of about 8–9 mm. Alternatively, a TO-8 package having a can diameter of about 13–15 mm may be used. Packaging the switch in such a small package is enabled by the combination of the lensed fibers with the bi-stable micro switch. The latching spring arms avoid the need for separate latching actuators.

Input and output optical signals are provided by four (4) optical fibers 122, 130, 134, one of which is not seen in this view but essentially is disposed opposite to fiber 134 and normal to fibers 122 and 130 to form a "+" configuration when viewed from the top. The fibers are attached to the MEMS device by cementing them in grooves that are etched into the silicon MEMS chip, and brought through the can 142 of the package. The can 42 is mounted to the header 146 of the package. Alternatively, a single isolated electrical lead may be used in conjunction with some types of actuators.

In yet another configuration two isolated leads are provided, one for a "push" signal and one for a "pull" signal, with a common package ground being provided by a ground pin 152. In any case, no more than two isolated electrical leads are needed because the latching technique of the present invention does not require a separate latching/de-latching signal, rather, only the actuator signal. A two-lead (isolated) configuration allows the packaged MEMS switch to be electrically isolated from other components, which may be desirable in the case of high-voltage (greater than 40 V) switching signals. Alternatively, a voltage converter chip can be included in the package to allow a relatively low voltage (e.g. 5 V) to be delivered to the package, which is then boosted to a voltage appropriate for driving the actuator (e.g. 40–80 V) inside the package. Electrical contacts, which provide the driving signal for the switch, are ultrasonic wire bonded from the isolated electrical leads in the header or otherwise electrically coupled to appropriate pads on the MEMS chip.

Figure 4D:
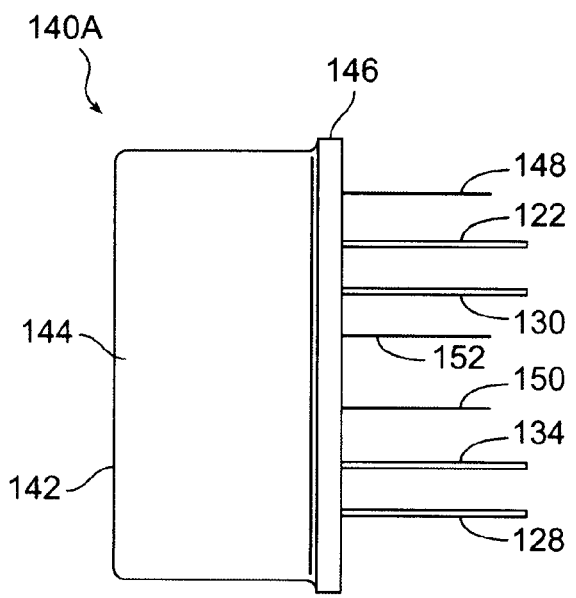
FIG. 4D is s simplified side view of a packaged optical switch according to another embodiment of the present invention.

FIG. 4D is an alternative embodiment of a packaged optical MEMS switch 140A according to an alternative embodiment of the present invention. The four optical fibers 122, 130, 134, and 128 are brought out through the header 146 of the package, rather than the can 142. A seal is made between the fibers and the header with epoxy or other sealant.

VI. MEMS Actuator Signal Waveforms

Novel waveforms are applied to the device to optimize switching speed and stable switch operation, and hence reliable optical output. In prior devices it has been common to provide a simple "square wave" electrical pulse to electrostatic comb actuators. Referring to FIG. 1C, particular attention is drawn to the higher stable well 62 and the potential maximum 60. Depending on the design of the switch, the movable portion of the switch can oscillate or "ring" after a switching pulse is applied. Movable portions with certain mass in combination with spring or actuator elements and dampening characteristics can overshoot the well position and spring back toward the potential maximum. The waveforms provided below are exemplary only to illustrate the concept that after the first, switching pulse, a second pulse is applied. The second pulse is timed to retard the acceleration of the actuator toward the target local equilibrium position or potential well, such acceleration being caused by the restoring force of the spring arms and/or hollow beam walls.

Simple minor ringing might cause variations in the optical signal amplitude. More severe ringing might move the mirror in and out of the optical input signal path(s), causing drop-out of the desired output and cross-talk in the undesired output. In some cases, overshoot might cause the movable body to spring back over the potential maximum, and settle in another (undesired) potential well, thus placing the switch in a non-selected state. In prior switches, oil has been applied to the switch to increase dampening. However, embodiments of the present invention avoid such measures by applying switching (actuator) waveforms having multiple segments.

Figure 5A:
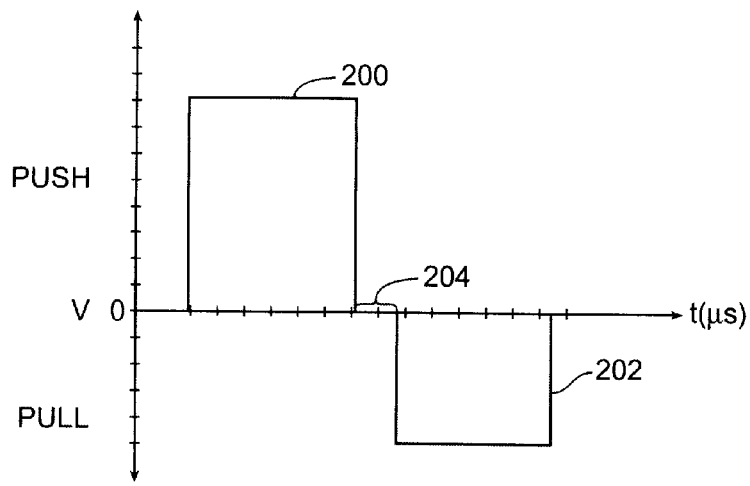
FIG. 5A is a simplified graphical representation of a switching signal according to an embodiment of the present invention.

FIG. 5A is a simplified graph of voltage versus time for a voltage waveform applied to a MEMS switch according to an embodiment of the present invention. The voltage may be applied directly from a signal generator or similar source, or a lower voltage may be applied to a voltage converter or amplifier. A first pulse 200 is provided to a first section of the electrostatic comb drive to push the movable portion of the switch from the first position toward the potential maximum. This pulse is about 83 V with a pulse width of about 160 micro-seconds. Those skilled in the art will appreciate that the pulse shown is idealized, and that the pulse form typically has some rounding of the corners and sloping of the walls. Furthermore, the voltage and duration are exemplary only, generally chosen according to a specific embodiment of switch to reliably and quickly drive the switch from a first state (FIG. 1C, ref. num. 59) to a second state (FIG. 1C, ref. num. 62) over the potential maximum. Other switches might optimally switch states with different voltages and pulse durations according to the mass and spring constant of the movable portions of the switch, among other factors, such as the difference between the potential well(s) and the potential maximum.

Figure 5B:
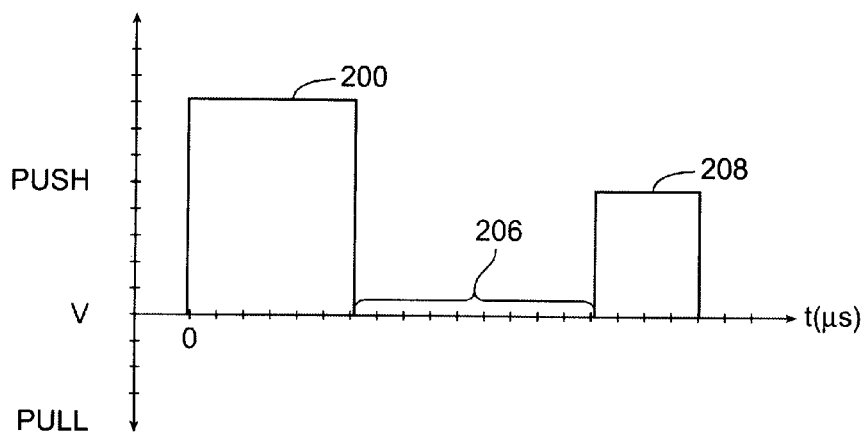
FIG. 5B is a simplified graphical representation of another embodiment of a switching signal according to an embodiment of the present invention.

A second pulse 202 is provided to a second section of the electrostatic comb drive to pull the movable portion of the switch in the opposite direction from the motion caused by the first pulse. It is understood that each of the two sections of the comb drive operates by attracting one half of the section to an opposing half of the section, and that "push" and "pull" are defined in terms of the movement of the center body. Furthermore, in a particular embodiment the MEMS device is fabricated with the mirror in an extended (bar) position, thus "pushing" from this position up the potential energy curve involves retracting the mirror. The second pulse is applied after the center body has passed the potential maximum, but before the center body has reached the second potential well center. The second pulse slows down, or decelerates, the center body, which is typically accelerating from the potential maximum due to the spring energy stored in the spring arms and hollow beam walls. The second pulse has a voltage of about 48 V and a duration of about 140 micro-seconds. The second pulse in FIG. 5A is shown as being inverted merely to illustrate that it has a different effect on the center body, and does not imply polarity of either pulse. A dwell period 204 of about 40 micro-seconds is provided between the first and second pulses to account for variations in switch fabrication, actuator performance, and the electrical pulse supply, for example. Ideally, an electrostatic switching signal waveform would provide enough force when applied to the actuator to rapidly accelerate the center body past the position of the potential maximum, and then start decelerating the center body in a fashion that would rapidly allow the mirror to assume the desired switch position with minimal ringing or overshoot FIG. 5B is a simplified graph of voltage versus time illustrating another waveform according to an embodiment of the present invention. A first pulse 200 is applied, as before in FIG. 5A; however, the dwell period 206 is increased to allow the center body to travel through the desired potential well and spring back through the well center toward the potential maximum. After the dwell period, a second pulse 208 is applied to keep the center body from traveling too far toward or over the potential maximum, thus reducing ringing and overshoot.

The switching waveforms illustrated in FIGS. 5A and 5B are for switching from a first state to a second state. A different waveform might be desired for switching from the second state to the first state. For example, referring again to FIG. 1C, the energy required to overcome the potential maximum from the lower well to the higher well is greater than the energy to overcome the potential maximum from the higher well to the lower well. Thus, in a further embodiment, two different waveforms are used to switch from opposite states, in other words the switching waveforms (signals) are non-symmetrical in that they deliver different energies to the actuator depending on the starting and ending switch states. The pulse width, as well as the voltage, and temporal shape and timing may be modified.

For example, when switching to the lower well position, more spring energy will be released from the spring arms and hollow beam walls, thus a longer and/or higher voltage pull pulse (ref. FIG. 5A, ref. num. 202) is appropriate. Using the appropriate amount of switching energy reduces overshoot when switching from a higher potential state and reduces the power required for a switch cycle, which is desirable in power limited situations, such as solar powered or battery powered applications, or environments where heat dissipation from the power supply is critical.

The above illustrations are merely examples of methods to apply a second electronic signal to a MEMS switch to improve operation of a MEMS switch. In the particular spring embodiments described above, a second pulse may be applied to retard acceleration as the center body travels past the potential maximum position toward the second well position. The spring energy stored in the latching spring arm-beam side wall structure contributes to this acceleration. Other MEMS switches may be improved and switch mechanisms may similarly benefit from an electronic switching signal applied as a series of electronic signals separated by selected periods of time. It is specifically understood that it may be desirable to apply more than two segments (e.g. pulses) of a switching signal to perform the desired switching function.

Figure 6A:
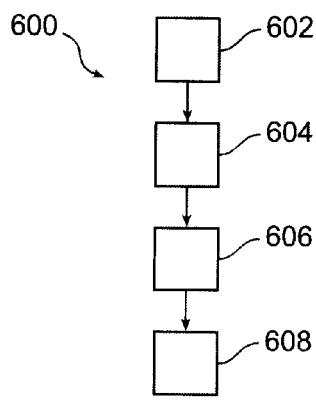
FIGS. 6A and 6B are simplified flow charts of processes according to embodiments of the present invention.

FIG. 6A is a simplified flow chart of a process of operating 600 a MEMS switch according to an embodiment of the present invention. A MEMS switch is provided in a first position (step 602). A first pulse of a switching signal is provided to the MEMS switch to move the switch toward a second position (step 604). After waiting for a selected dwell period (step 606), a second pulse (step 608) is provided to the MEMS switch to place the switch in a second position.

In a particular embodiment the MEMS switch includes an electrostatic comb drive actuator, the first pulse is a push pulse and the second pulse is a pull pulse. In another embodiment, both pulses are push pulses. In another embodiment, the switching from the first position (switch state) to the second is accomplished with the application of the switching signal, and switching back from the second position to the first position is accomplished with stored mechanical energy. In a non-latching switch, the switching signal (i.e. the signal applied to change states) may be followed with a switch holding signal (i.e. the signal applied to hold a state). In some embodiments, these two types of signals may be continuous in time.

Figure 6B:
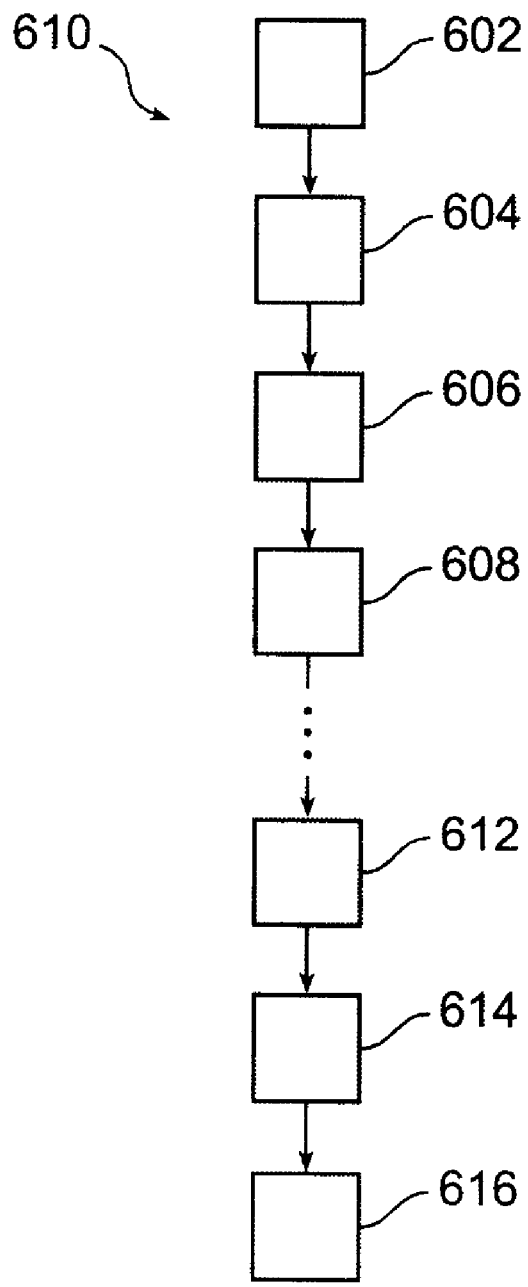

FIG. 6B is a simplified flow chart of a process of cycling 610 a MEMS switch according to another embodiment of the present invention. A MEMS switch is provided in a first position (602). A first pulse is provided to the switch (604), and after waiting a first selected dwell period (606), a second pulse is provided to the MEMS switch (608) to place the switch in a second position. When it is desired to cycle the switch back to its first position, a third pulse is applied (step 612) and after waiting a second selected dwell period (step 614), a fourth pulse is applied (616). The first and third pulses may be substantially similar or quite different, as may be the second and fourth pulses, as discussed above in conjunction with FIGS. 5A and 5B.

While the description above provides a full and complete disclosure of the preferred embodiments of the present invention, various modifications, alternatives, and equivalents will be obvious to those of skill in the art. For example, while embodiments of the invention have been described primarily with reference to monolithic MEMS electrostatic comb drive actuators embodiments of the present invention might employ other types of actuators, such as various other electrostatic actuators, thermal actuators, and magnetic actuators. Accordingly, the scope of the invention is limited solely by the following claims.

What is claimed is:

1. A method of operating a micro-electro-mechanical system ("MEMS") switch, the method comprising:

providing the MEMS switch in a first switch position;

applying an electronic signal to the MEMS switch;

accelerating a movable portion of the MEMS switch with the electronic signal from the first switch position toward a second switch position; and decelerating the movable portion of the MEMS switch with the electronic signal before the movable portion of the MEMS switch reaches the second switch position.

2. The method of claim 1 wherein the MEMS switch includes an electrostatic comb drive actuator.

3. The method of claim 1 wherein the electronic signal includes a first electronic pulse with a first maximum voltage and a second electronic pulse with a second maximum voltage, the first maximum voltage being greater than the second maximum voltage.

4. The method of claim 3 wherein the first maximum voltage is approximately twice the second maximum voltage.

5. The method of claim 1 wherein the electronic signal is essentially a square-wave pulse.

6. The method of claim 1 wherein the MEMS switch has a spring arm attached to the movable portion of the MEMS switch and to a static portion of the MEMS switch.

7. The method of claim 1 wherein the movable portion of the MEMS switch has an intermediate point between the first switch position and the second switch position corresponding to a maximum potential point, the step of accelerating occurring while the movable portion is between the first switch position and the intermediate point, and the step of decelerating occurring while the movable portion is between the intermediate point and the second switch position.

8. The method of claim 1 further comprising steps of:

applying a second electronic signal to the MEMS switch; and accelerating the movable portion of the MEMS switch with the second electronic signal from the second switch position toward the first switch position.

9. The method of claim 8 wherein the electronic signal has a first energy and the second electronic signal has a second energy, the first energy being greater than the second energy.

10. The method of claim 8 further comprising a step, after the step of accelerating the movable portion of the MEMS switch with the second electronic signal of:

decelerating the movable portion of the MEMS switch with the second electronic signal.

11. The method of claim 9 further comprising a step, after the step of accelerating the movable portion of the MEMS switch with the second electronic signal, of:

decelerating the movable portion of the MEMS switch with the second electronic signal.

12. The method of claim 1 wherein the MEMS switch is a latching switch.

13. A method of operating a micro-electro-mechanical system ("MEMS") switch, the method comprising:

providing the MEMS switch in a first switch position;

applying a first electronic pulse to a first portion of an electrostatic comb drive actuator of the MEMS switch to accelerate a center body of the MEMS switch from the first switch position toward a second switch position;

waiting a selected period of time; and applying a second electronic pulse to a second portion of the electrostatic comb drive actuator to decelerate the center body before the MEMS switch reaches the second switch position.

14. The method of claim 13 wherein the MEMS switch is a bi-stable switch, the center body traveling through an intermediate point between the first switch position and the second switch position, the intermediate point corresponding to a maximum potential energy position of the center body.

15. A method of cycling a micro-electro-mechanical system ("MEMS") switch, the method comprising:

providing the MEMS switch in a first switch position;

applying a first electronic signal to the MEMS switch to accelerate a movable portion of the MEMS switch from the first switch position toward a second switch position;

waiting a first selected period of time;

applying a second electronic signal to the MEMS switch to retard motion of the movable portion;

applying a third electronic signal to the MEMS switch to accelerate the movable portion of the MEMS switch from the second switch position toward the first switch position;

waiting a second selected period of time; and applying a fourth electronic signal to the MEMS switch to retard motion of the movable portion.

16. The method of claim 15 wherein the first electronic signal is capable of delivering a first energy to the MEMS switch and the third electronic signal is capable of delivering a second energy to the MEMS switch, the first energy being greater than the second energy.

* * * * *